US009374495B2

(12) United States Patent
Sewell et al.

(10) Patent No.: US 9,374,495 B2
(45) Date of Patent: Jun. 21, 2016

(54) PRINTER WITH OUTSOURCING CAPABILITY FOR COLOR COPIES

(75) Inventors: Michael B. Sewell, Houghton Regis (GB); Marcin Cholkowski, Perth (AU); Natalia Vershinina, St. Petersburg (RU); Wayne Rudge, Reading (GB); Rebecca Mallaband, Loughborough (GB); Asif Qureshi, Hertford (GB); Erroll Elliston, London (GB); Gregory C. Sosinski, Fairport, NY (US); Edward J. Solcz, Fairport, NY (US); Christian G. Midgley, Fairport, NY (US)

(73) Assignee: XEROX CORPORATION, Norwalk, CT (US)

(*) Notice: Subject to any disclaimer, the term of this patent is extended or adjusted under 35 U.S.C. 154(b) by 2715 days.

(21) Appl. No.: 11/847,474

(22) Filed: Aug. 30, 2007
(Under 37 CFR 1.47)

(65) Prior Publication Data

US 2008/0297830 A1    Dec. 4, 2008

Related U.S. Application Data

(60) Provisional application No. 60/874,549, filed on Dec. 13, 2006.

(51) Int. Cl.
*G06F 3/12* (2006.01)
*H04N 1/23* (2006.01)
(Continued)

(52) U.S. Cl.
CPC ......... *H04N 1/2307* (2013.01); *H04N 1/00278* (2013.01); *H04N 1/00347* (2013.01); *H04N 1/233* (2013.01); *H04N 1/2338* (2013.01); *H04N 1/2361* (2013.01); *H04N 1/32502* (2013.01); *H04N 1/32529* (2013.01); *H04N 2201/0039* (2013.01); *H04N 2201/0041* (2013.01); *H04N 2201/0049* (2013.01); *H04N 2201/0055* (2013.01)

(58) Field of Classification Search
USPC .................. 358/1.15, 1.12, 2.1, 1.13; 399/82
See application file for complete search history.

(56) References Cited

U.S. PATENT DOCUMENTS

| 5,568,246 A | 10/1996 | Keller et al. |
| 5,570,172 A | 10/1996 | Acquaviva |
| 5,596,416 A | 1/1997 | Barry et al. |

(Continued)

OTHER PUBLICATIONS

U.S. Appl. No. 11/102,332, filed Apr. 8, 2005, Hindi.
(Continued)

*Primary Examiner* — Marivelisse Santiago Cordero
*Assistant Examiner* — Neil R McLean
(74) *Attorney, Agent, or Firm* — Fay Sharpe LLP

(57) ABSTRACT

A printing system includes first and second communicatively linked printers, each including a print engine and a processor which controls the operation of the respective print engine. A scanner, associated with the first printer, scans a hardcopy document and generates image data therefrom. The scanner is for communicating the image data to the first printer. A graphical user interface is provided through which user selections are communicated to at least one of the scanner and the first printer. The first processor has a first mode of operation in which a print job derived from the image data is printed on the first print engine and a second mode of operation in which a print job is exported to the second printer for printing. At least one of the first and second modes of operation is invoked at least in part by user interaction with the graphical user interface.

25 Claims, 6 Drawing Sheets

(51) Int. Cl.
*H04N 1/00* (2006.01)
*H04N 1/32* (2006.01)

(56) References Cited

U.S. PATENT DOCUMENTS

| | | | |
|---|---|---|---|
| 5,995,721 | A | 11/1999 | Rourke et al. |
| 6,512,899 | B2 * | 1/2003 | Shimada et al. ............... 399/82 |
| 6,973,286 | B2 | 12/2005 | Mandel et al. |
| 2004/0083186 | A1 | 4/2004 | Castellani et al. |
| 2004/0083187 | A1 | 4/2004 | Andreoli et al. |
| 2005/0012953 | A1 * | 1/2005 | Fujishige et al. ............ 358/1.13 |
| 2005/0108036 | A1 | 5/2005 | Andreoli et al. |
| 2005/0259287 | A1 * | 11/2005 | Watanabe .................... 358/1.12 |
| 2006/0033771 | A1 | 2/2006 | Lofthus |
| 2006/0067756 | A1 | 3/2006 | Anderson et al. |
| 2006/0114497 | A1 | 6/2006 | Anderson et al. |
| 2006/0132826 | A1 | 6/2006 | Ciriza et al. |

OTHER PUBLICATIONS

U.S. Appl. No. 11/102,355, filed Apr. 8, 2005, Fromherz, et al.
U.S. Appl. No. 11/102,910, filed Apr. 8, 2005, Crawford, et al.
U.S. Appl. No. 11/157,598, filed Jun. 21, 2005, Frankel.
U.S. Appl. No. 11/166,581, filed Jun. 24, 2005, Lang, et al.
U.S. Appl. No. 11/318,745, filed Dec. 27, 2005, Castellani, et al.
U.S. Appl. No. 11/359,065, filed Feb. 22, 2005, Banton.

* cited by examiner

PRINTER WITH OUTSOURCING CAPABILITY FOR COLOR COPIES

This application claims the priority of U.S. Provisional Application Ser. No. 60/874,549, filed Dec. 13, 2006, entitled PRINTER WITH OUTSOURCING CAPABILITY FOR COLOR COPIES, the disclosure of which is incorporated herein by reference in its entirety.

CROSS REFERENCE TO RELATED PATENTS AND APPLICATIONS

The following co-pending applications, the disclosures of each being totally incorporated herein by reference, are mentioned:

U.S. application Ser. No. 11/102,910, filed Apr. 8, 2005, entitled "COORDINATION IN A DISTRIBUTED SYSTEM," by Lara S. Crawford, et al.;

U.S. application Ser. No. 11/102,355, filed Apr. 8, 2005, entitled "COMMUNICATION IN A DISTRIBUTED SYSTEM," by Markus P. J. Fromherz, et al.;

U.S. application Ser. No. 11/102,332, filed Apr. 8, 2005, entitled "ON-THE-FLY STATE SYNCHRONIZATION IN A DISTRIBUTED SYSTEM," by Haitham A. Hindi;

U.S. application Ser. No. 11/157,598, filed Jun. 21, 2005, entitled "METHOD OF ORDERING JOB QUEUE OF MARKING SYSTEMS," by Neil A. Frankel;

U.S. application Ser. No. 11/166,581, filed Jun. 24, 2005, entitled "MIXED OUTPUT PRINT CONTROL METHOD AND SYSTEM," by Joseph H. Lang, et al.;

U.S. application Ser. No. 11/318,745, filed Dec. 27, 2005, entitled "AUTONOMOUS DECISION-MAKING IN PRINT JOB REDIRECTION," by Stefania Castellani, et al.; and U.S. application Ser. No. 11/359,065, filed Feb. 22, 2005, entitled "MULTI-MARKING ENGINE PRINTING PLATFORM", by Martin E. Banton.

BACKGROUND

The exemplary embodiment relates to the printing arts. It finds particular application in conjunction with a printer capable of outsourcing the printing of a copy job to another printer having appropriate capabilities for printing the copy job.

Multifunction devices which are capable of producing both color and monochrome copies of an electronic document, such as a scanned document, are widely available and provide a user with a range of options for rendering the document on a print media, such as paper. However, the costs of printing both color and black and white documents on such a device can be relatively high because the printer is maintained in a state of readiness in which it is capable of providing color prints for much of the time. For example, toners are agitated periodically in the respective developer housings, a fuser may be maintained at a high temperature for producing glossy color prints, and the like. This adds a cost to operation of the printer, even when the device is used for monochrome printing. Wear and failure of such components incurring downtime and replacement costs also adds to the overall cost of running such a device.

INCORPORATION BY REFERENCE

The following references, the disclosures of each being totally incorporated herein by reference, relate generally to what have been variously called "tandem engine" printers, "parallel" printers, or "cluster printing" (in which an electronic print job may be split up for distributed higher productivity printing by different printers, such as separate printing of the color and monochrome pages): U.S. Pat. Nos. 5,568,246, 5,570,172, 5,596,416, 5,995,721, 6,973,286, U.S. Publication Nos. 2006/0033771, 2006/0067756, 2006/0114497.

U.S. Publication No. 2006/0132826, published Jun. 22, 2006, entitled "AUTOMATED JOB REDIRECTION AND ORGANIZATION MANAGEMENT," by Victor Ciriza, et al. discloses a method for managing a plurality of communicatively coupled systems which includes collecting job log data, determining a user community for each of the plurality of system using the job log data, calculating overlapping communities for pairs of the plurality of systems, and defining a redirection matrix using the overlapping communities for managing operation of the plurality of systems.

U.S. Publication No. 2005/0108036, published May 19, 2005, entitled GRAPH-BASED NEGOTIATION SYSTEM WITH ENCAPSULATED CONSTRAINT SOLVER," by Jean-Marc Andreoli, et al. discloses a method and apparatus for carrying out a negotiation between autonomous components using graphs.

U.S. Publication No. 2004/0083186, published Apr. 29, 2004, entitled "SYSTEM FOR NEGOTIATION USING GRAPHS," by Stefania Castellani, et al. discloses a method and apparatus for negotiating performance of a set of actions by a plurality of participants in the negotiation.

U.S. Publication No. 2004/0083187, published Apr. 29, 2004, entitled "SYSTEM FOR NEGOTIATION WITH MIRRORING," by Jean-Marc Andreoli, et al. discloses a method and system for conducting a negotiation among a plurality of participants.

BRIEF DESCRIPTION

In accordance with one aspect of the exemplary embodiment, a printing system includes a first printer including a first print engine and a first processor which controls the operation of the first print engine. A scanner scans a hardcopy document and generates image data therefrom. The scanner is associated with the first printer for communicating the image data to the first printer. A second printer is independently operable from the first printer and is communicatively linked to the first printer. The second printer includes a second print engine and a second processor which controls the operation of the second print engine. A graphical user interface is provided through which user selections are communicated to at least one of the scanner and the first printer. The first processor has a first mode of operation in which a print job derived from the image data is printed on the first print engine and a second mode of operation in which a print job derived from the image data is exported to the second printer for printing on the second print engine. At least one of the first and second modes of operation is invoked at least in part by user interaction with the graphical user interface.

In another aspect of the exemplary embodiment, a method includes providing a first printer with first and second modes of operation, a scanner associated with the first printer, and a second printer communicatively linked to the first printer. The method includes invoking one of the first and second modes of operation and scanning a hard copy document to generate image data. When the first mode of operation is invoked, a print job derived from the image data is printed on the first printer. When the second mode of operation is invoked, a print job derived from the image data is exported to the second printer for printing.

In another aspect, a printing system includes an autonomous first printer including a monochrome print engine, a first processor which controls the operation of the monochrome print engine, a graphical user interface, and a scanner. A second autonomous printer is communicatively linked to the first printer. The second printer includes a color print engine and a second processor which controls the operation of the second print engine. The first processor has a first mode of operation in which a print job derived from image data generated by the scanner is printed on the monochrome print engine and a second mode of operation in which a print job derived from image data generated by the scanner is exported to the second printer for printing on the color print engine. At least one of the first and second modes is invoked at least in part by user interaction with the graphical user interface.

DETAILED DESCRIPTION

Aspects of the exemplary embodiment relate to a printing system and to a method for outsourcing of a copy job to another printer for printing on print media.

A "printer" can include any device for rendering an image on print media, such as a copier, printer, bookmaking machine, facsimile machine, or a multifunction machine. In general, a printer may include at least one print engine which includes components for rendering an image on print media and optionally fixing the image to the print media. Exemplary print engines include xerographic print engines, inkjet print engines, and the like.

"Print media" can be a usually flimsy physical sheet of paper, plastic, or other suitable physical print media substrate for images, A "print job" is normally one or a set of related sheets, usually one or more collated copy sets copied from a set of original print job sheets or electronic document page images, from a particular user, or otherwise related. An image generally may include information in electronic form which is to be rendered on the print media by the printing system and may include text, graphics, pictures, and the like. A print job may include image information and an associated job ticket which provides instructions for rendering the image(s). A "copy job" is generally a print job which is generated, at least in part, by scanning an original hardcopy document. The operation of applying images to print media, for example, graphics, text, photographs, etc., is generally referred to herein as printing.

Figure 1:
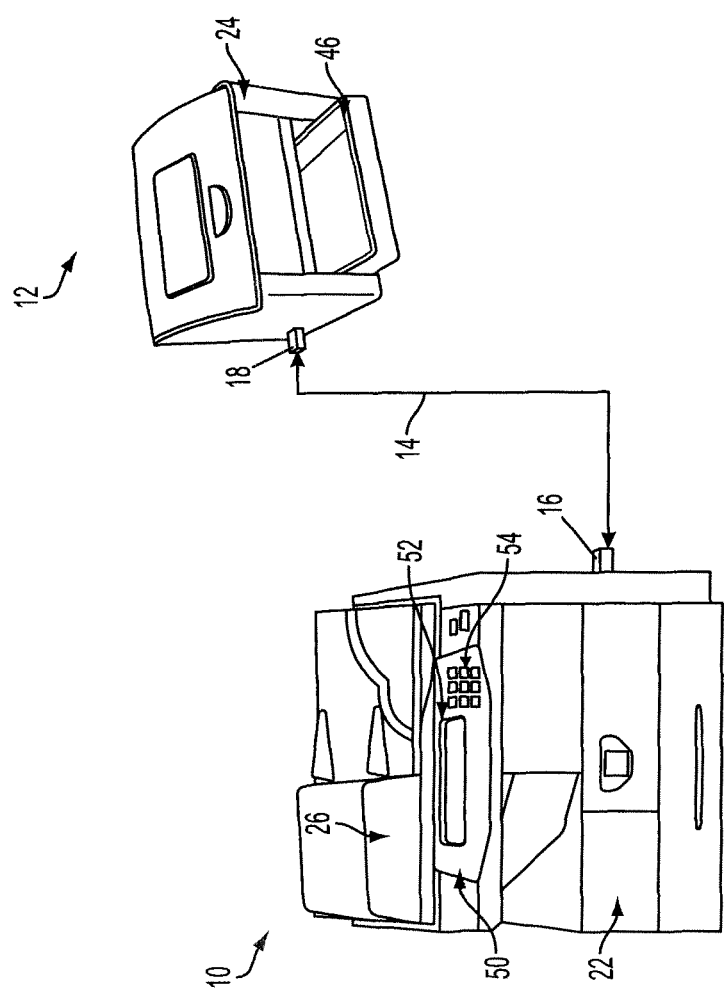
FIG. 1 is a perspective view of a printing system in accordance with a first aspect of the exemplary embodiment.

With reference to FIG. 1, a printing system is shown. The printing system includes first and second autonomous printers 10, 12 which are communicatively linked together. The first printer 10 may be considered as the primary printer, through which a print job to be printed is input. The second printer 12 may be considered as the external printer, which receives the print job from the first printer when the second printer 12 is selected for rendering the print job on print media.

Figure 2:
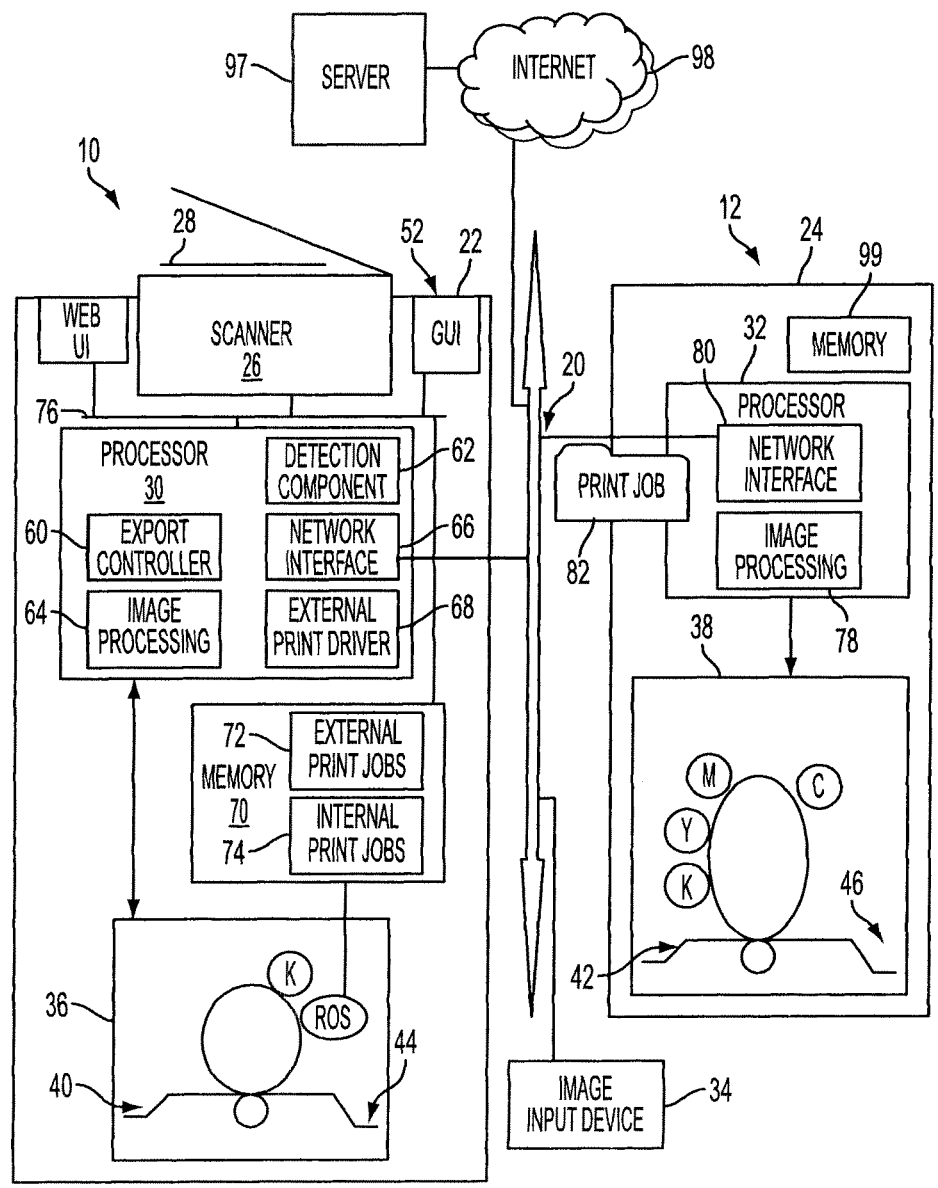
FIG. 2 is a functional block diagram of a printing system in accordance with a second aspect of the exemplary embodiment

In the embodiment of FIG. 1, the two printers 10, 12 are connected via a wired link 14, such as via communication ports 16, 18 of the respective devices 10, 12. Communication ports 16, 18 can be parallel printer ports, serial ports for high performance serial bus connections, such as FireWire™, or USB (universal serial bus) ports for direct link between the two printers. However, other links are contemplated, such as a wireless link or a link via a network 20, such as Local Area Network (LAN) connection such as an Ethernet connection, as illustrated in FIG. 2. The printers 10, 12 illustrated in FIG. 1 are stand alone, autonomous devices, each capable of independent operation and in which the operational and processing components are housed in a separate housing 22, 24, respectively.

In one embodiment, the first printer 10 has a first printing mode and the second printer 12 has a second printing mode which is different from and/or lacking in the first printer 10 (either permanently or temporarily). In the embodiments illustrated, the first and second printing modes are monochrome (single colorant, such as black) and color (multiple colorant) printing, respectively, although it is to be appreciated that the capabilities may be reversed. Other printing capabilities are also contemplated. For example, printer 12 may provide a custom colorant, a different print medium (e.g., one with a different weight, color, composition, coating, and/or size), a different print resolution (e.g., a higher or lower dpi (dots per inch)), a wide format for printing which is wider than any of the standard formats provided by the primary printer, or combination of two or more printing capabilities not available (at least temporarily) on the printer 10.

The printers 10, 12 can be xerographic printers, inkjet printers, a combination thereof, or other suitable printers. While the printing system is shown as comprising only two printers 10, 12, it will be appreciated that more than two printers may be communicatively linked together in the printing system. In the exemplary embodiment, printer 10 is a monochrome device which prints the print media with only a single colorant, such as black ink or toner (K). Printer 12 is a color device which prints with a plurality of colorants, such as cyan, magenta, yellow and optionally also black colorants (CMYK), such as toners or inks.

The illustrated monochrome printer 10 is a multifunction device with scanning capability. In particular, the printer 10 includes, i.e., is operatively linked to, or otherwise associated with, a scanner 26. In the embodiment of FIG. 1, scanner 26 is mounted to housing 22. Scanner 26 enables an original, hard-copy document 28 to be recorded as digital image data in color as well as black. Typically, in scanning a hard-copy document, a document sheet is illuminated and the light reflected from the document sheet is recorded by a photosensitive device such as a CCD (charge coupled device) or CMOS (complementary metal oxide semiconductor) array, to be converted to digital image data. Commonly, a narrow strip of the document sheet is illuminated as the sheet is moved through a document handler, or the photosensitive device is moved relative to a platen on which the document sheet is placed.

As shown in FIG. 2, each printer includes a central processing unit or processor 30, 32 which controls operation of the respective printer 10, 12 and conducts image processing. In particular, the printer 10 receives the digital image data from scanner 26 or from a workstation 34, such as a personal computer or other image input device, via a wired or wireless link, such as network 20. Printer 12 may also receive digital image data from workstation 34 but not directly from scanner 26. During image processing, the processor 30, 32 converts the received digital image data into a form in which it can be printed on print media by an associated print engine 36, 38 of the respective printer 10, 12. In general, such conversion may include converting the digital image data for an image to be rendered from a device independent color space into a device dependent color space, which includes colorant values for the particular colorant or set of colorants utilized by the printer.

In the embodiment of FIG. 2, both print engines are illustrated as xerographic print engines. Print engines 36, 38 may thus include some or all of the components commonly found in xerographic print engines. In general, the print engine may include a charge retentive surface, such as a rotating photoreceptor in the form of a belt or drum. The images to be printed are created on a surface of the photoreceptor. Disposed at various points around the circumference of the photoreceptor are xerographic components which each perform a portion of a printing operation. These components may include a charging station for each of the colors to be applied (one in the case of monochrome printer 10, four in the case of CMYK printer 12), such as a charging corotron, an exposure station, such as a raster output scanner (ROS), which forms a latent image on the photoreceptor, a developer unit, associated with each charging station, for developing the latent image formed on the surface of the photoreceptor, a transferring unit, such as a transfer corotron, for transferring the image to print media, and a fuser, for permanently affixing the image to the print media. Paper or other print media is supplied to the print engine along a paper path from one or more print media supply trays 40, 42. The printed media is output to a finisher, herein illustrated as an output paper tray 44, 46 although one or both finishers may provide additional functionality, such as hole punching, stapling, bookbinding, folding, and the like.

The printer 10 includes a user interface (UI) 50 which allows a user to interface with the printer 10 to make selections, such as when scanning an image. In other embodiments, the user interface 50 communicates with the scanner 26 which in turn communicates with the printer 10. The graphical user interface 50 illustrated in FIG. 1 is adapted to display graphical and/or text messages, and includes a liquid crystal display (LCD) screen 52 and/or a keypad 54. Screen 52 may be a touch screen device. Other user interfaces are contemplated, such as those employing an alphanumeric keyboard, cursor control device, monitor, joystick, combinations thereof, or other device by which a user can be presented with printing options for selection and input selections to the scanner 26 and/or processing component 30.

For example, in the case of a touch screen device 52, the processor 30 (or a processing component in the scanner 26) causes a menu of options to be displayed on the screen 52. The user selects one or more of the presented options by pressing the screen or bringing the finger into sufficiently close proximity to the screen for its location to be detected, e.g., by heat sensors. Various methods of presenting options to the user via the screen are contemplated, such as a toolbar, pop-up windows, scrollbars (a graphical slider that can be set to horizontal or vertical positions along its length), menu bars (a list of options, which may be used to initiate actions presented in a horizontal list), drop down menus (a list of options that can be used to present menu sub-options), and the like which may be user-selectable via the touch screen 52 alone or in combination with the keypad 54 or solely by the keypad. In yet another embodiment, the user input device comprises a workstation, such as a personal computer, linked by a wired or wireless link to the processor 30 or scanner 26.

Figure 3:
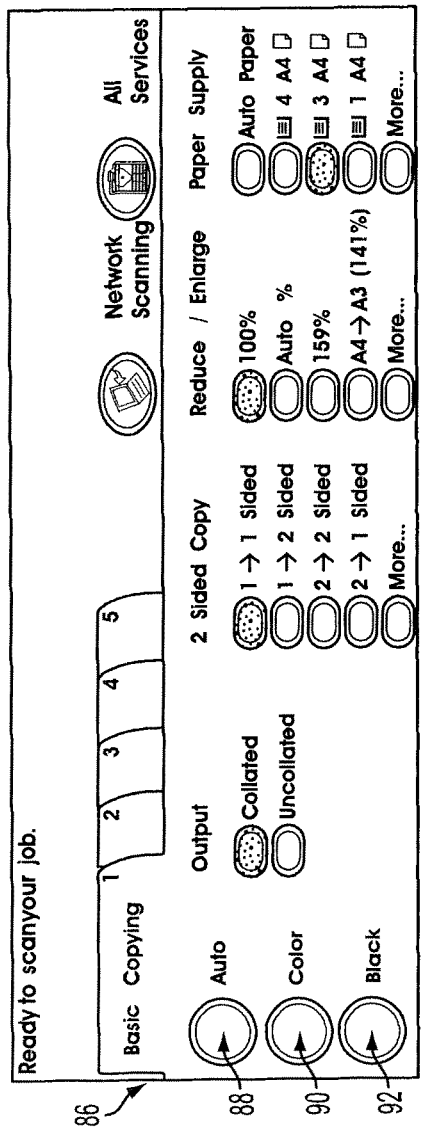
FIG. 3 is a screen shot of a graphical user interface of the printing system of FIG. 1 or FIG. 2.

The processor 30 may include a variety of processing components, such as an export controller 60, a printer detection component 62, an image processing component 64, a print driver component 66, and a network interface 68, which execute instructions stored in associated memory 70 for performing machine implemented steps of the exemplary method described herein and illustrated in FIG. 3. The components 60, 62, 64, 66, 68, described in greater detail below, may be provided as software or hardware add-ons to a conventional printer central processing unit. The memory may include non-volatile memory for storing the instructions as well as volatile memory for storing information related to a scanned print job. A specific location 72 in the volatile memory may be reserved for print jobs invoking the second mode of operation. Print jobs for printing by the print engine 36 may be stored in a second location 74. In one embodiment, the scanner 26 directs print jobs to the location 72 which are to invoke the second mode of operation. When the processor 30 detects a print job in that location, the second mode of operation is automatically invoked. A separate location 74 in memory 70 may be reserved for internal print jobs to be printed on the primary printer 10.

A variety of different types of memory storage devices, such one or more of random access memory (RAM), read only memory (ROM), an optical or magnetic data storage device such a floppy disk, hard disk, CD ROM, or other computer readable medium which is read from and/or written to by a magnetic, optical, or other reading and/or writing system that is coupled to the processor 30, can be used for memory 70.

The export controller 60 controls the outsourcing of print jobs to the second printer 12. In particular, the export controller 60 communicates with the second printer for obtaining a print driver and/or other information which may be used for configuring the first printer so that it is capable of exporting the print job in a form acceptable to the second printer. The export controller 60 may also control the transfer of a print job to the second printer or a selected one of a plurality of second printers through communication with a processing component of the second printer, e.g., via the network. The printer detection component 62, where present, is capable of detecting printers on the same network. One tool which may be utilized to provide this function is the Xerox Printing Scout™. The image processing component 64 conducts normal image processing on print jobs to be printed by the first print engine 36 and may also conduct preliminary image processing for print jobs to be printed on the second print engine 38. The print driver component 66, where present, includes one or more print drivers, at least one of the print drivers being configured for placing a print job in a format accepted by the second printer 12. The network interface 68 allows the processor to communicate with other printers 12 or devices on the network. Components of the printer 10 may communicate via a system bus 76.

The second printer processor 32 may include analogous components to some or all of the components of the processor 30, including an image processing component 78 which conducts normal image processing on print jobs to be printed by the second print engine 38 and a network interface 80, which allows the processor 32 to communicate with other printers 10 or devices on the network.

In one embodiment, the printer 10 has a first mode of operation in which a scanned document is printed by the primary printer 10 and a second mode of operation in which a scanned document is not printed by the printer 10 but rather is exported (outsourced) to the external printer 12 for printing. In the exemplary embodiment, the first mode of operation may be a scan to monochrome mode and the second mode of operation may be a scan to color mode. The primary printer 10 is thus capable of copying to the primary printer and/or to the external printer 12. Specifically, the primary printer 10 is capable of generating a print job which is ultimately printed on the primary printer (an "internal print job") and is also configured for generating a print job 82 which is ultimately printed on the second printer (an "external print job"). The printing parameters for the external print job (e.g., color or monochrome) may be invoked at least in part, by user input, e.g., via the GUI 50. For example, the printing parameters may be invoked through specific selection of the parameters via the GUI, selection of options which cause the processor 30 to select the parameters, or automatically, by use of a default setting, which causes the processor 30 to identify the parameters, based on the document being scanned and the capabilities of the external printer 12.

For example, the GUI 50 may permit selection of a specific printer for printing a copy job by displaying a list of available printers for printing which includes the external printer. Or, the selection of the first or second mode of operation may be performed automatically by the printer 10, for example, based on a feature of the hardcopy document, such as its size, the presence of color, or the like. In another embodiment, the processor 30 may select the printer based on printing parameters selected by the user. For example, as illustrated in the exemplary screenshot shown in FIG. 3, when a user selects a scanning mode the processor 30 may cause the GUI 50 to display a screen 86, which allows printing parameters for the second printer 12 to be selected. In the illustrated embodiment, the user selects one of three mode section buttons 88, 90, 92. When a user selects a parameter which requires the print job to be printed by the external printer 12, the GUI 50 may display additional selectable printing parameters which are available in the external printer.

Figure 4:
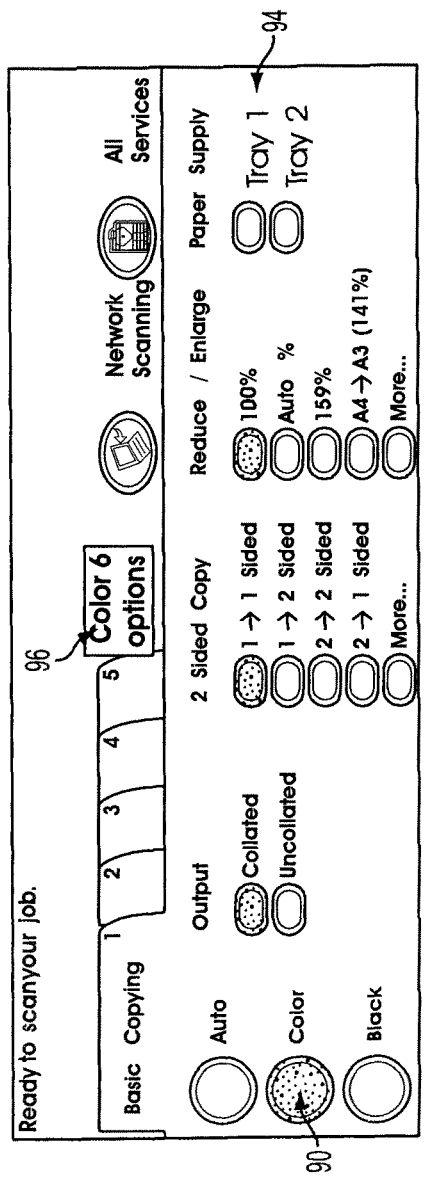
FIG. 4 is a second screen shot of the graphical user interface FIG. 3 in which a user has selected color printing of a copy of a hardcopy document.
Figure 5:
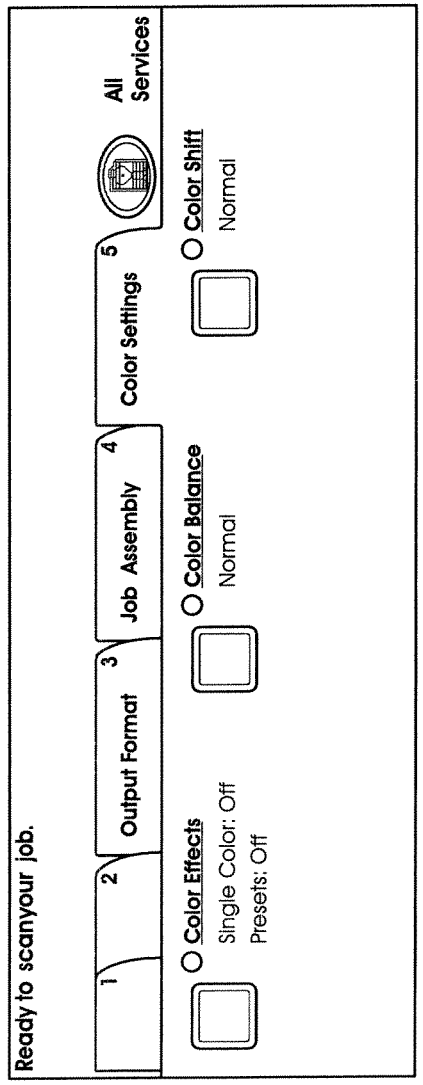
FIG. 5 is a third screen shot of the graphical user interface FIG. 3 in which a user has selected a color options tab which caused the interface to display color printing options.

In the embodiment illustrated in FIG. 3, the user has selected a Basic Copying mode which causes the screen to display AUTO, COLOR, and BLACK selectable options 88, 90, 92. If the user selects BLACK, the first mode of operation (internal printing) is automatically invoked. If the user selects COLOR, the second mode of operation (external printing) is automatically invoked. If the user selects AUTO, the processor 30 determines which mode of operation is most appropriate for the print job, for example by detecting whether the image is monochrome or includes at least some color component, and invokes the appropriate mode of operation. In the embodiment illustrated in FIG. 4, the user has selected COLOR printing by pressing button 90 and the GUI 50 automatically displays those paper supply parameters 94 which are available in the external printer 12, which in the illustrated embodiment, are different from those available on the primary printer 10. If the user had selected BLACK, or the first mode of operation had been otherwise invoked, the GUI 50 may continue to display the paper supply parameters of the primary printer 10 on the screen. When the second mode of operation is invoked, the GUI 50 may also present other printing parameters available only on the external device 12. In the screen shot shown in FIG. 4, an additional color settings tab 94 is displayed once the second printing mode is invoked. If the user selects the color settings tab, color-related parameters are selectable, such as color effects (e.g., to make the copy "cooler" or "warmer"), color balance (for adjusting specific color channels), and color shift (to adjust the hue of specific colors), as shown in FIG. 5. Another color-related parameter which may be selectable is saturation adjustment.

As will be appreciated from the foregoing, in the second operational mode, the printer 10 may cause the GUI 50 to display user-selectable printing parameters for generating a copy job which the printer 10 is incapable of printing and which parameters may be only available on the external printer 12.

Depending on the operational mode invoked and/or the printing parameters selected, one or more of the following may be affected:
1) scanning parameters, such as high or low scan speed, resolution, scan width, number of color channels, and the like;
2) image processing of the scanned information by the processor 30 (for example, if the user has selected color effects, color balance, or color shift parameters);
3) the page description language (PDL) used for the job ticket, particularly if the PDL accepted by the external printer 12 is different from that used by the primary printer 10.

As will be appreciated, the processor 30 may include fewer, more or different components to those illustrated and the functions of two or more components may be combined. The components of the processor 30 may all be located in the same physical location or may be distributed throughout the printer 10 and/or scanner 26 or elsewhere in network 20 or other processing device in communication with printer 10. The memory 70 and processing components 60, 62, 64, 66, 68 may be separate or may be combined, as in a single chip.

In one embodiment, both printers 10, 12 may have the capability of functioning as a primary printer and/or an external printer. Thus, in one embodiment, printer 12 may be configured for exporting monochrome print jobs to printer 10 and include components analogous to those of processor 30.

Figure 6:
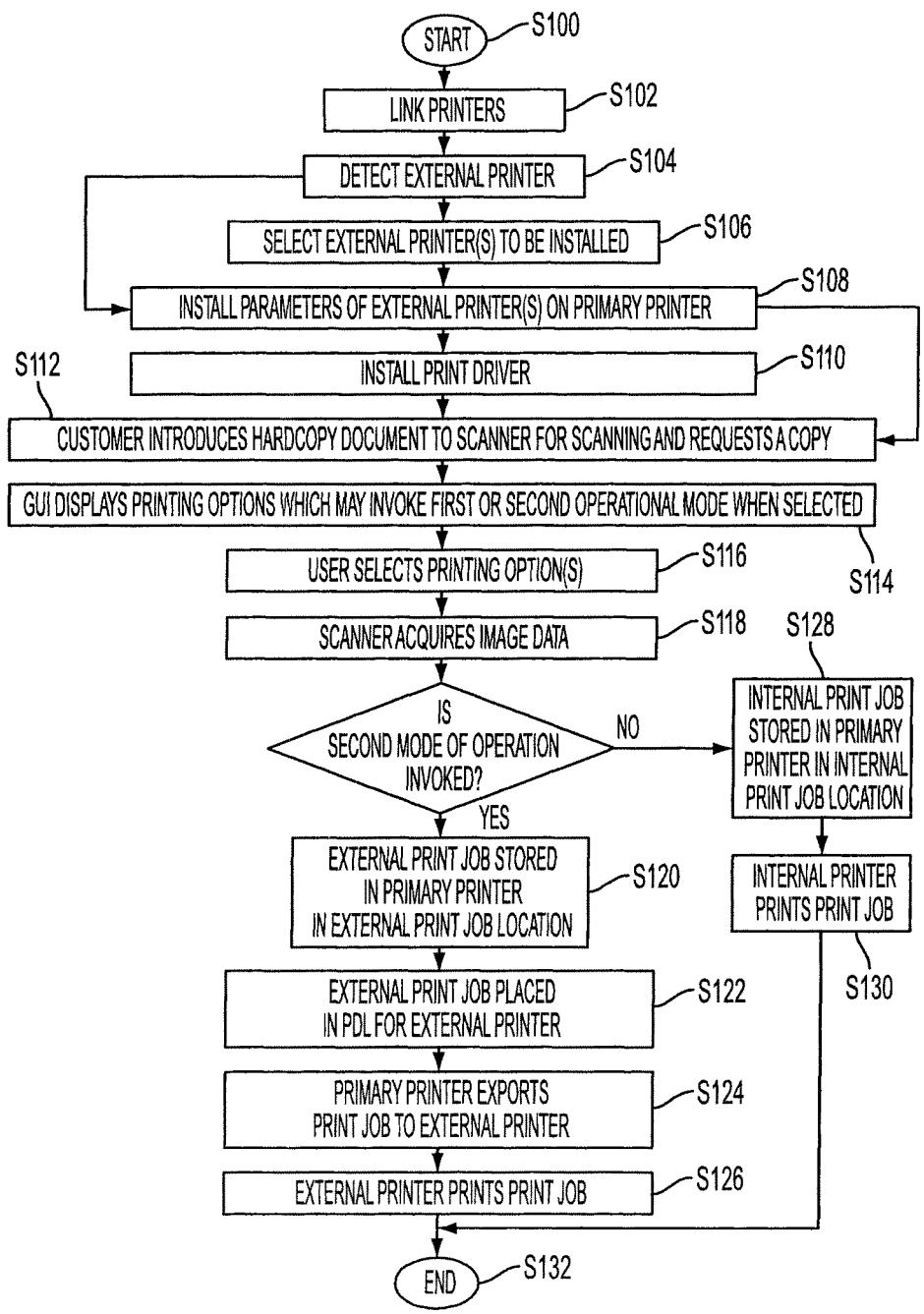
FIG. 6 illustrates steps in a method in accordance with the exemplary embodiment.

With reference now to FIG. 6, an exemplary method of outsourcing a print job is illustrated. It is to be appreciated that the method may include fewer, more, or different steps and that the steps need not be performed in the order illustrated.

The method begins at step S100. At step S102, a wired or wireless communication link 14, 20 is established between the primary printer 10 and the external printer 12.

At step S104, an external printer is detected 12. For example, once a USB or FireWire connection 14 is made between the two printers 10, 12, the detection component 62 automatically detects the external printer 12. In another embodiment, the printer detection component 62 detects printers on the same network 20. In other embodiments, the external printer 12 is identified by inputting its IP address to the primary printer processor, e.g., via the graphical user interface 50, with detection following automatically.

At step S106, if more than one external printer has been detected at step S104, a user may be presented with a choice of printers to install, for example via the user interface 50. The user may then select one or more external printers for installation. Alternatively, this step may be omitted and installation may proceed automatically.

At step S108, the external printer is installed on the primary printer 10. This step includes storing information about the printer parameters of the external printer 12 on the primary printer 10. Printer parameters may include information on the tray sizes available, resolution, printer language, communication port, and the like. The information may be stored in a specific location in memory 70 to be retrieved when the second mode of operation is invoked. In one embodiment, the installation step proceeds automatically. For example, the processor 30 downloads the parameters from a web based server 97, e.g., via the Internet 98. In another embodiment, a user may manually submit the printing parameters of the external printer, for example, via the GUI 50.

At step S110, print drivers for printer 12 may be installed on printer 10 by print driver component 68. This is particularly helpful when printer 12 accepts a different PDL from that used by the primary printer 10. The print driver installed on printer 10 thus enables a print job to be generated in an acceptable PDL prior to being exported to printer 12. For example, printer 10 may use a platform independent PDL, such as PCL or PostScript, which describes the graphical appearance of pages with respect to an imaging model. The application generates a device independent description in page description language which can be interpreted by a program controlling a specific output device, which renders the image on the device. The Adobe Portable Document Format (PDF) is widely used interchange format based on PostScript for electronic documents in that it is largely platform independent. A job ticket may be embedded in a PDF file, for example, using Adobe's Portable Job Ticket Format, or appended to it. If the second printer 12 does not accept PostScript files, a print driver which converts the PostScript file into another PDL may be installed on printer 10. If the two printers use the same PDL, this step may be omitted.

At step S112 a customer places a hard copy document 28 on the platen of the scanner 26 for scanning (or in the tray from which it can be drawn by the scanner for scanning). The user may select a scanning (copying to a printer) mode from the available function modes (e.g., where other function modes, such as faxing, are also available).

At step S114, the processor 30 registers that a request for scanning has been requested and causes the GUI 50 to display at least two options—one which invokes the first mode of operation (primary printer) and one which invokes the second mode of operation (external printer), at least in some cases. In the illustrated embodiment shown in FIG. 3, the GUI 50 displays three options, scanning to color (invoking the second mode), scanning to black (invoking the first mode) and an automatic option, in which the scanner/processor determines whether the second mode should be invoked, e.g. based on the properties of the document to be copied, such as presence or absence of color. Or, the GUI 50 may display a list of available printers. The list may include the primary printer 10 and one or more external printers 12. The external printer or printers may include one or more printers on the network which the primary printer has previously recognized and may have installed drivers, as appropriate.

At step S116, the user may select one of the mode-related options.

If at step S116, the user selects an option invoking the second mode of operation (e.g., the "color" selection button), the processor 30 may cause the GUI 50 to display further selectable options which relate to the parameters available on the external printer 12. As shown in FIGS. 3 and 4, for example, the displayed paper supply options change from those available on the primary printer 10 to the more limited set of options 94 available on the color printer 12. Additionally, a selectable tab 96 relating to further options available in the second mode is displayed. If selected, further options relating to the second mode are displayed. In one embodiment, options not available on the external printer may be greyed out or otherwise indicated as unavailable when color copying is not selected. If a plurality of external printers is available for printing in the second mode, the processor 30 may cause the GUI to display a list of available external printers 12 from which a user can select one of the external printers for printing the job. Or, the GUI may display other related information from which a user can select which invokes a selection of one of the external printers.

At step S118 the scanner acquires a scanned image of the hardcopy document. Generally, the document is scanned to a PDL format, such a PDF format, which is accepted by the first printer 10 and stored in the location 72 in memory 70 on the first printer which is reserved for external print jobs. Color matching for the specific printers attached can be used to achieve higher accuracy colour copying. For example, an International Color Consortium (ICC) color profile for the second printer may be obtained and stored on the first printer. A color management tool incorporated in the image path within the scanning machine may then be utilized to optimize the color output for the second printer.

Device color profiles provide color management systems with the information necessary to convert color data between color spaces. These models provide color transformations which enable colors captured on one device to be reproduced satisfactorily on others. The information required in the profile is adequate to ensure the level of color fidelity selected by the user and for the design of a default color management module (CMM) to transform color information between native device color spaces.

At step S120, if the print job has been placed in the specific location 72 in memory reserved for external print jobs, the processor 30 recognizes that an external print job has arrived and the appropriate print driver 68 places the print job in a format in which it can be exported. In one embodiment, the appropriate print driver converts the print job to a print ready format e.g., a PostScript or PCL format, acceptable to the external printer (if the second printer is known to accept a specific format).

At step S122, the primary printer may send the external print job to the second printer, e.g. via the direct link or via the network to the IP address of the external printer. Alternatively, at step S122, the user may be requested to type in the IP address of an external printer or select an external printer from those available. As will be appreciated, the exporting of the print job may be preceding with outsourcing communications between the two printers 10, 12, in which the operational state of printer 12 and its capability for executing the print job current are confirmed. Particularly in the case where multiple external printers are available, the printer 10 may negotiate with one or more of the external printers for outsourcing of the job, as disclosed, for example, in above-mentioned U.S. Publication Nos. 2006/0132826, 2005/0108036, 2004/0083186, and 2004/0083187, incorporated by reference.

At step S124, the processor 30 exports the print job to printer 12. The GUI may display a message indicating the location and/or name of the printer where the job is to be printed and/or the location of the finisher tray where the printed job will be delivered.

At step S126, the processor 32 of printer 12 receives the exported print job via its network interface and prints the print job in the normal way. Of course, once the processor 30 has exported the print job, it has no control over whether the printer 12 ultimately prints the job. From that point on, printer 12 takes over the print job. The processor 32 of the printer 12 may place the job in its job queue and convert the print job into a form which can be rendered by its associated print engine including such steps as color correction of the image data to match the color gamut of the print engine, raster image processing of the image data for each page of the print job to provide colorant values for each pixel of an image to be printed, and the like. The developed raster image data may be stored for each CMYK color component, in a memory 99 until the time of printing. The print engine 38 prints the print job based on the raster image data and outputs the printed pages to the finisher 46 associated with the printer 12. In an alternative embodiment, the printed pages may be conveyed to the finisher 44 associated with printer 10, for example, to provide finishing operations such as stapling, hole punching, folding, or booklet making, and the like which are not available on the second printer 12. In one embodiment, a post process inserter on the finisher 44 of the first printer 10 is utilized for feeding the printed pages to the finisher 44. The method ends at step S132.

If at step S116, the user opts to print in the first printing mode or otherwise invokes the first printing mode, the processor 30 generates a print job for the first printer and prints the print job in the normal way. In particular, the print job arrives at location 74 in memory for internal print jobs (step S128) and is raster image processed and printed on the print engine 36 (step S130).

Aspects of the embodiment provide various advantages over providing a multifunction device with the functionality of the primary printer and the external printer. One advantage of the exemplary printing system is that it enables color copying to be performed at lower cost than on a multifunction device which offers both color and black printing. This can be achieved without losing monochrome-performance at speed. Another advantage of the system is that it enables a variety of printers having different functional capabilities to be coupled to the primary printer. The external printers may be proximate the primary printer, e.g., in the same room, or may be in a different location such as a different room or building from the primary printer. The external printers do not need to provide scanning and other capabilities typically associated with a multifunction device, reducing the cost of such devices. In one embodiment, a facility includes several multifunction devices which may all serve as primary printers and which are configured to export print jobs to the same external printer. The external printer may be one which offers functionality not available on the primary printer which is used infrequently in the facility, such a wide format printer, which may be used, for example, for banner printouts of photos. Another advantage is that a customer can freely choose from available compatible printers if they so desire.

Another advantage is that it is relatively easy to implement for networked products as standard file formats are now widely accepted. Operating systems, such as Linux OS, are adaptable to print externally with many tools available open source. Another advantage is that a "never-down" behavior can be approximated. For example, if the copy function of the primary printer is unavailable due to the print engine being out of commission, the output can be redirected to another printer.

Identical or close color matching of the copy to that of the original can be achieved using device specific mappings. This can provide more accurate color rendering than a PC-based solution where the color mapping to the output device is often distorted by the user's subjective experience of color using a monitor and non-standardized software.

The method illustrated in FIG. 6 may be implemented in a computer program product that may be executed, at least in part, by the processing component 30 (such as machine implemented steps S104-S110, S114, S118, S120-124, and S128-130). The computer program product may be a tangible computer-readable recording medium on which a control program is recorded, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A printing system comprising:
   a first printer including a first print engine and a first processor which controls the operation of the first print engine;
   a scanner which scans a hardcopy document and generates image data therefrom, the scanner being associated with the first printer for communicating the image data to the first printer;
   a second printer, operable independently of the first printer, which is communicatively linked to the first printer, the second printer including a second print engine and a second processor which controls the operation of the second print engine; and
   the first printer including a graphical user interface, through which user selections for scanning hardcopy documents with the scanner and for printing the scanned images are communicated to the first processor;
   the first processor having a first mode of operation in which a print job derived from the image data is printed on the first print engine and a second mode of operation in which a print job is exported to the second printer for printing on the second print engine, at least one of the first and second modes of operation being invoked at least in part by user interaction with the graphical user interface.

2. The system of claim 1, wherein the graphical user interface enables a user to select from a plurality of printing parameters, at least a first of the printing parameters invoking the first mode of operation and at least a second of the printing parameters invoking the second mode of operation.

3. The system of claim 1, wherein the first printer prints in a first printing mode and the second printer prints in a second printing mode different from the first printing mode.

4. The system of claim 3, wherein one of the first and second modes of printing is a monochrome mode and the other of the first and second modes of printing is a color mode.

5. The system of claim 1, wherein one of the first and second print engines is a monochrome print engine and the other of the first and second print engines is a color print engine.

6. The system of claim 1, wherein the second operational mode is invoked by at least one of:
   a user selection of a color scanning mode;
   a user selection of an external printing mode;
   a user selection of an automatic mode in which the mode is invoked based at least in part on the hardcopy document being scanned.

7. The system of claim 1, wherein the second operational mode is invoked when a wider format mode of printing is selected through user interaction with the graphical user interface.

8. The system of claim 1, wherein the first printer lacks a print engine capable of printing in the second mode of printing.

9. The system of claim 1, wherein the first processor includes a print driver for the second printer which when the second mode of printing is invoked, generates a print job derived from the image data in a print ready format which is accepted by the second printer.

10. The system of claim 1, wherein the first and second printers are linked by at least one of a direct link and a network link.

11. The system of claim 1, wherein the first printer includes a printer detection component which detects other communicatively linked printers from which the second printer is selectable.

12. The system of claim 1, wherein the first printer is configured for displaying information on at least one communicatively linked printer on the graphical user interface whereby a user selected one of the linked printers is selectable by a user as the second printer.

13. A printing system comprising:
a first printer including a first print engine and a first processor which controls the operation of the first print engine;
a scanner which scans a hardcopy document and generates image data therefrom, the scanner being associated with the first printer for communicating the image data to the first printer, the scanner being configured for scanning the hardcopy document in a monochrome scanning mode and a color scanning mode;
a second printer, operable independently of the first printer, which is communicatively linked to the first printer, the second printer including a second print engine and a second processor which controls the operation of the second print engine, wherein one of the first and second print engines is a monochrome print engine and the other of the first and second print engines is a color print engine; and
a graphical user interface, through which user selections are communicated to at least one of the scanner and the first printer;
the first processor having a first mode of operation in which a print job derived from the image data is printed on the first print engine and a second mode of operation in which a print job is exported to the second printer for printing on the second print engine, at least one of the first and second modes of operation being invoked at least in part by user interaction with the graphical user interface, and wherein when the first operational mode is invoked, the scanner scans in the monochrome scanning mode, and when the second operational mode is invoked, the scanner scans in the color scanning mode.

14. A method comprising:
providing a first printer with first and second modes of operation, a scanner associated with the first printer and a second printer communicatively linked to the first printer;
invoking one of the first and second modes of operation, the invoking including receiving a user selection on a graphical user interface which enables a user to select from a plurality of printing parameters, at least a first of the printing parameters invoking the first mode of operation and at least a second of the printing parameters invoking the second mode of operation;
scanning a hard copy document in accordance with the invoked mode of operation to generate image data;
when the first mode of operation is invoked, printing a print job derived from the image data on the first printer;
when the second mode of operation is invoked, exporting a print job derived from the image data to the second printer for printing.

15. The method of claim 14, wherein when the first mode of operation is invoked, the first printer prints in a first printing mode and when the second mode of operation is invoked the second printer prints in a second printing mode different from the first printing mode.

16. The method of claim 15, wherein the first printer is at least temporarily incapable of printing in the second printing mode when the second mode of operation is invoked.

17. The method of claim 15, wherein one of the first and second modes of printing is a monochrome mode and the other of the first and second modes of printing is a color mode.

18. The method of claim 14, wherein one of the first and second printers comprises a monochrome print engine and the other of the first and second printers comprises a color print engine.

19. The method of claim 14, wherein in the first mode of operation, the scanning includes scanning in a first scanning mode and in the second mode of operation, the scanning includes scanning in a second scanning mode different from the first scanning mode.

20. The method of claim 19, wherein one of the first and second scanning modes comprises a monochrome scanning mode and the other of the first and second scanning modes comprises a color scanning mode.

21. The method of claim 14, wherein the second mode of operation is invoked by at least one of:
a user selection of a color scanning mode;
a user selection of an external printing mode;
a user selection of the second printer from a displayed list of printers; and
a user selection of an automatic mode in which the mode of operation is invoked based at least in part on the hardcopy document being scanned.

22. The method of claim 14, wherein when the second mode is invoked, the method further includes converting the image data to a print ready format which is accepted by the second printer prior to exporting the print job to the second printer.

23. The method of claim 22, further comprising: installing a print driver on the first printer, the print driver configured for converting the image data to the print ready format which is accepted by the second printer.

24. The method of claim 14, wherein the second printer comprises a plurality of second printers and the method includes displaying information on the second printers whereby a user selects the second printer.

25. A printing system comprising:
an autonomous first printer including a monochrome print engine and a first processor which controls the operation of the monochrome print engine, a graphical user interface in communication with the first processor, and a scanner, the graphical user interface presenting printing options for selection by a user and providing for the user to input selections to the scanner;
an autonomous second printer communicatively linked to the first printer, the second printer including a color print engine and a second processor which controls the operation of the second print engine;
the first processor having a first mode of operation in which a print job derived from image data generated by the scanner is printed on the monochrome print engine and a second mode of operation in which a print job derived from image data generated by the scanner is exported to the second printer for printing on the color print engine, at least one of the first and second modes being invoked at least in part by user interaction with the graphical user interface; and wherein the scanner is configured for scanning in a monochrome scanning mode and a color scanning mode and wherein when the first operational mode is invoked the scanner thereafter scans in the monochrome scanning mode, and when the second operational mode is invoked, the scanner thereafter scans in the color scanning mode.

\* \* \* \* \*